US011695521B2

(12) United States Patent
Jiang et al.

(10) Patent No.: US 11,695,521 B2
(45) Date of Patent: *Jul. 4, 2023

(54) METHODS AND APPARATUSES FOR TRANSMITTING A REFERENCE SIGNAL

(71) Applicant: NEC CORPORATION, Tokyo (JP)

(72) Inventors: Chuangxin Jiang, Beijing (CN); Yukai Gao, Beijing (CN); Zhennian Sun, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,998

(22) Filed: Mar. 9, 2021

(65) Prior Publication Data

US 2021/0218524 A1 Jul. 15, 2021

Related U.S. Application Data

(63) Continuation of application No. 16/739,886, filed on Jan. 10, 2020, now Pat. No. 10,979,189, which is a
(Continued)

(51) Int. Cl.
*H04L 5/00* (2006.01)
*H04L 27/26* (2006.01)
(Continued)

(52) U.S. Cl.
CPC ......... *H04L 5/0021* (2013.01); *H04B 7/0413* (2013.01); *H04L 5/0048* (2013.01);
(Continued)

(58) Field of Classification Search
None
See application file for complete search history.

(56) References Cited

U.S. PATENT DOCUMENTS 10,594,454 B2   3/2020 Jiang et al.
10,979,189 B2 * 4/2021 Jiang .................. H04B 7/0413
(Continued)

FOREIGN PATENT DOCUMENTS

CN    101626620 A    1/2010
CN    101771435 A    7/2010
(Continued)

OTHER PUBLICATIONS

Communication dated Jul. 30, 2021 by the Chinese Patent Administration Office in application No. 201680057834.3.
(Continued)

*Primary Examiner* — Diane L Lo
(74) *Attorney, Agent, or Firm* — Sughrue Mion, PLLC

(57) ABSTRACT

Embodiments of the present disclosure relate to a method and apparatus of transmitting a reference signal and a method and apparatus of receiving a reference signal. In one embodiment of the present disclosure, the method of transmitting a reference signal comprises receiving a reference signal configuration indication, wherein reference signal resources are divided into at least two reference signal groups, and the reference signal configuration indication indicates a reference signal configuration including a reference signal group configuration; and transmitting the reference signal using a reference signal sequence in a reference signal group as indicated by the reference signal group configuration, wherein the reference signal sequence can be multiplexed with another layer or another user in different reference signal groups. With embodiments of the present disclosure, reference signals for different layers or users can be multiplexed in different reference signal groups and thus, more mu-users with unequal allocated bandwidths can be supported without significant channel estimation loss and Peak to Average Power Ratio (PAPR) loss.

19 Claims, 12 Drawing Sheets

Related U.S. Application Data continuation of application No. 15/761,272, filed as application No. PCT/CN2016/071500 on Jan. 20, 2016, now Pat. No. 10,594,454.

(51) Int. Cl.
  *H04W 76/27* (2018.01)
  *H04B 7/0413* (2017.01)
  *H04W 88/02* (2009.01)
  *H04W 72/23* (2023.01)

(52) U.S. Cl.
  CPC ........ *H04L 5/0051* (2013.01); *H04L 27/2613* (2013.01); *H04W 72/23* (2023.01); *H04W 76/27* (2018.02); *H04L 5/0007* (2013.01); *H04W 88/02* (2013.01)

(56) References Cited

U.S. PATENT DOCUMENTS

| | | |
|---|---|---|
| 2010/0157918 A1 | 6/2010 | Kim et al. |
| 2010/0296465 A1 | 11/2010 | Hooli et al. |
| 2011/0170562 A1 | 7/2011 | Hu et al. |
| 2012/0300728 A1 | 11/2012 | Lee et al. |
| 2013/0128821 A1 | 5/2013 | Hooli et al. |
| 2013/0230123 A1 | 9/2013 | Noh et al. |
| 2014/0016574 A1 | 1/2014 | Seo et al. |
| 2014/0036850 A1 | 2/2014 | Akimoto et al. |
| 2014/0241303 A1 | 8/2014 | Yoon et al. |
| 2014/0307699 A1 | 10/2014 | Sorrentino |
| 2016/0112994 A1 | 4/2016 | Wang et al. |

FOREIGN PATENT DOCUMENTS

| | | |
|---|---|---|
| CN | 102014475 A | 4/2011 |
| CN | 102265537 A | 11/2011 |
| CN | 102404854 A | 4/2012 |
| JP | 2013-516888 A | 5/2013 |
| JP | 2014192860 A | 10/2014 |
| JP | 2014529227 A | 10/2014 |
| KR | 10-2013-0031934 A | 3/2013 |
| KR | 1020140056334 A | 5/2014 |
| KR | 10-2017-0063615 A | 6/2017 |
| WO | 2014/054219 A1 | 4/2014 |
| WO | 2014113546 A1 | 7/2014 |

OTHER PUBLICATIONS

Communication dated Jun. 2, 2021 by the Korean Patent Office in application No. 10-2021-7005164.
Communication dated Mar. 3, 2021 by the Korean Patent Office in application No. 10-2021-7005164.
ZTE, "On Physical Channel Design for D2D Discovery", 3GPP TSG-RAN WG1 #77, May 19-23, 2014, R1-142227 (6 pages total.
Notice of Preliminary Rejection communication dated Oct. 15, 2019 from the Korean Intellectual Property Office in application No. 10-2018-7007776.
Qualcomm Inc., "DM-RS enhancements for higher order MU-MIMO", 3GPP TSG-RAN WG1 #82, Aug. 24-28, 2015, R1-153882 (6 pages total).
Communication dated Feb. 12, 2019, from the Japanese Patent Office in counterpart application No. 2018-520392.
International Search Report for PCT/CN2016/071500 dated Oct. 24, 2016 [PCT/ISA/210].
Communication dated May 15, 2018 from the Australian Government IP Australia in counterpart Application No. 2016387360.
Communication dated Feb. 21, 2019, from European Patent Office, in counterpart application No. 16885608.6.
Ericsson, "Introduction of Rel-13 eCA", 3GPP TSG-RAN WG1 Meeting #83, Nov. 15-22, 2015, R1-156967 (22 pages total).
Communication dated Sep. 10, 2019, from the Japanese Patent Office in application No. 2018-520392.
Communication dated Jun. 19, 2020 by the Intellectual Property Office of India in application No. 201817009940.
Communication dated Jun. 12, 2020 by the European Patent Office in application No. 16 885 608.6.
English Translation of Chinese publication No. 102404854 dated Apr. 4, 2012.
English Translation of Chinese publication No. 101626620 dated Jan. 13, 2010.
English Translation of Chinese publication No. 101771435 dated Jul. 7, 2010.
Japanese Office Action for JP Application No. 2021-097272 dated May 31, 2022 with English Translation.

* cited by examiner

Table 5.5.2.1.1-1: Mapping of Cyclic Shift Field in uplink-related DCI format to $n^{(2)}_{DMRS,\lambda}$ and $\left[ w^{(\lambda)}(0) \quad w^{(\lambda)}(1) \right]$

| Cyclic Shift Field in uplink-related DCI format [3] | $n^{(2)}_{DMRS,\lambda}$ | | | | $\left[ w^{(\lambda)}(0) \quad w^{(\lambda)}(1) \right]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

Fig. 3

Table 5.5.2.1.1-2: Mapping of *cyclicShift* to $n^{(1)}_{DMRS}$ values

| cyclicShift | $n^{(1)}_{DMRS}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

| Cyclic Shift Field in uplink-related DCI format [3] | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 4 | 10 | $[1\ 1]$ $\Delta_{TC}=0$ | $[1\ 1]$ $\Delta_{TC}=0$ | $[1\ -1]$ $\Delta_{TC}=0$ | $[1\ -1]$ $\Delta_{TC}=0$ |
| 001 | 8 | 2 | 4 | 10 | $[1\ -1]$ $\Delta_{TC}=0$ | $[1\ -1]$ $\Delta_{TC}=0$ | $[1\ 1]$ $\Delta_{TC}=1$ | $[1\ 1]$ $\Delta_{TC}=1$ |
| 010 | 4 | 10 | 8 | 2 | $[1\ -1]$ $\Delta_{TC}=1$ | $[1\ -1]$ $\Delta_{TC}=1$ | $[1\ 1]$ $\Delta_{TC}=0$ | $[1\ 1]$ $\Delta_{TC}=0$ |
| 011 | 2 | 8 | 10 | 4 | $[1\ 1]$ $\Delta_{TC}=1$ | $[1\ 1]$ $\Delta_{TC}=1$ | $[1\ -1]$ $\Delta_{TC}=1$ | $[1\ -1]$ $\Delta_{TC}=1$ |
| 100 | 6 | 0 | 10 | 4 | $[1\ -1]$ $\Delta_{TC}=0$ | $[1\ -1]$ $\Delta_{TC}=1$ | $[1\ 1]$ $\Delta_{TC}=0$ | $[1\ 1]$ $\Delta_{TC}=1$ |
| 101 | 10 | 4 | 8 | 2 | $[1\ -1]$ $\Delta_{TC}=1$ | $[1\ -1]$ $\Delta_{TC}=0$ | $[1\ 1]$ $\Delta_{TC}=1$ | $[1\ 1]$ $\Delta_{TC}=0$ |
| 110 | 0 | 10 | 6 | 4 | $[1\ -1]$ $\Delta_{TC}=0$ | $[1\ 1]$ $\Delta_{TC}=0$ | $[1\ -1]$ $\Delta_{TC}=1$ | $[1\ 1]$ $\Delta_{TC}=1$ |
| 111 | 8 | 4 | 0 | 10 | $[1\ 1]$ $\Delta_{TC}=1$ | $[1\ -1]$ $\Delta_{TC}=1$ | $[1\ 1]$ $\Delta_{TC}=0$ | $[1\ -1]$ $\Delta_{TC}=0$ |

Fig. 11

| | | OCC | DMRS group | DMRS sequence in slot 0 | DMRS sequence in slot 1 |
|---|---|---|---|---|---|
| UE0 | 0 | [1  1] | 0 | $R_0$ | $R'_0$ |
| UE1 | 6 | [1 -1] | 0 | $R_1$ | $-R'_1$ |
| UE2 | 2 | [1  1] | 1 | $R_2$ | $-R'_2$ |
| UE3 | 8 | [1 -1] | 1 | $R_3$ | $-R'_3$ |

Fig. 12

| | | OCC | DMRS group | DMRS sequence in slot 0 | DMRS sequence in slot 1 |
|---|---|---|---|---|---|
| Legacy UE0 | 0 | [1  1] | 0 | $R_0$ | $R'_0$ |
| UE1 | 6 | [1  -1] | 0 | $R_1$ | $-R'_1$ |
| UE2 | 8 | [1  -1] | 1 | $R_2$ | $-R'_2$ |

| Cyclic Shift Field in uplink-related DCI format [3] | $n^{(2)}_{DMRS,\lambda}$ | | $[w^{(\lambda)}(0)\ w^{(\lambda)}(1)]$ | |
|---|---|---|---|---|
| | $\lambda = 0$ | $\lambda = 1$ | $\lambda = 0$ | $\lambda = 1$ |
| 000 | 0 | 3 | [1 1] | [1 1] |
| 001 | 6 | 9 | [1 −1] | [1 −1] |
| 010 | 3 | 6 | [1 −1] | [1 −1] |
| 011 | 4 | 7 | [1 1] | [1 1] |
| 100 | 2 | 5 | [1 1] | [1 1] |
| 101 | 8 | 11 | [1 −1] | [1 −1] |
| 110 | 10 | 1 | [1 −1] | [1 −1] |
| 111 | 9 | 0 | [1 1] | [1 1] |

4 REs for one OCC group resources

METHODS AND APPARATUSES FOR TRANSMITTING A REFERENCE SIGNAL

CROSS REFERENCE TO RELATED APPLICATIONS

This application is a Continuation of U.S. patent application Ser. No. 16/739,886, filed on Jan. 10, 2020, which is a Continuation Application of U.S. Pat. No. 10,594,454, issued on Mar. 17, 2020, which is a National Stage of PCT/CN2016/071500, filed on Jan. 20, 2016.

FIELD OF THE INVENTION

Embodiments of the present disclosure generally relate to wireless communication techniques and more particularly relate to a method and apparatus for transmitting a reference signal and a method and apparatus for receiving a reference signal.

BACKGROUND OF THE INVENTION

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The Long Term Evolution (LTE) standard is currently evolving with enhanced MIMO support. A core component in LTE is support of MIMO antenna deployments and MIMO related techniques. Currently one-dimensional (horizontal) antenna array can provide flexible beam adaption in the azimuth domain only through the horizontal precoding process, while fixed down-tilt is applied in the vertical direction.

Recently, it has been found that the full MIMO capability can be exploited through leveraging two-dimensional (2D) antenna planar such that the user-specific elevation beamforming and spatial multiplexing on the vertical domain are possible. Moreover, it was also proposed for the uplink (UL) demodulation reference signal (DMRS) to support additional orthogonal ports for partially overlapping.

Besides, since the channel variation is slow in time domain if a higher center frequency is used, the sparse RS can be used in time domain. In other words, in the future 5G communication, only one or few symbols in time domain for RS transmission is proposed to reduce overhead, wherein a Zadoff-Chu (ZC) sequence was proposed to be used in the new subframe structure. For purpose of illustration, FIG. 1 illustrates one of possible new subframe structures, in which there is only one symbol for RS transmission in one TTI. However, it shall be appreciated that in another possible new subframe structure, the symbol may also be located in another position and/or it comprises more than one UL/DL symbol.

Thus, in the future 5G communication, it is possible to use only one of few symbols of DMRS for both UL and downlink (DL). In such a case, in order to support higher order multi-user MIMO (MU-MIMO), it shall consider using more orthogonal ports for partially overlapping BWs.

Therefore, in the art, a new DMRS design and new reference signal transmission and receiving solutions are required so as to adapt for the new subframe structure with the new channel characteristic variation in the time domain and support more users or more layers.

SUMMARY OF THE INVENTION

In the present disclosure, there is provided a new solution for reference signal transmission and receiving to mitigate or at least alleviate at least part of the issues in the prior art.

According to a first aspect of the present disclosure, there is provided a method of transmitting a reference signal. The method may comprise receiving a reference signal configuration indication, wherein reference signal resources are divided into at least two reference signal groups, and the reference signal configuration indication indicates a reference signal configuration including a reference signal group configuration; and transmitting the reference signal using a reference signal sequence in a reference signal group as indicated by the reference signal group configuration, wherein the reference signal sequence can be multiplexed with another layer or another user in different reference signal groups.

In a second aspect of the present disclosure, there is provided a method of receiving a reference signal. The method may comprise transmitting a reference signal configuration indication, wherein reference signal resources are divided into at least two reference signal groups, and the reference signal configuration indication indicates a reference signal configuration including a reference signal group configuration; and receiving the reference signal transmitted by using a reference signal sequence in a reference signal group as indicated by the reference signal group configuration, wherein the reference signal sequence can be multiplexed with another layer or another user in different reference signal groups.

In a third aspect of the present disclosure, there is also provided an apparatus for transmitting a reference signal. The apparatus may comprise an indication receiving module, configured for receiving a reference signal configuration indication, wherein reference signal resources are divided into at least two reference signal groups, and the reference signal configuration indication indicates a reference signal configuration including a reference signal group configuration; and a signal transmission module, configured for transmitting the reference signal using a reference signal sequence in a reference signal group as indicated by the reference signal group configuration, wherein the reference signal sequence can be multiplexed with another layer or another user in different reference signal groups.

In a fourth aspect of the present disclosure, there is provided an apparatus of receiving a reference signal. The apparatus may comprise an indication transmission module, configured for transmitting a reference signal configuration indication, wherein reference signal resources are divided into at least two reference signal groups, and the reference signal configuration indication indicates a reference signal configuration including a reference signal group configuration; and a signal receiving module, configured for receiving the reference signal transmitted by using a reference signal sequence in a reference signal group as indicated by the reference signal group configuration, wherein the reference signal sequence can be multiplexed with another layer or another user in different reference signal groups.

According to a fifth aspect of the present disclosure, there is also provided a computer-readable storage media with computer program code embodied thereon, the computer program code configured to, when executed, cause an apparatus to perform actions in the method according to any embodiment in the first aspect.

According to a sixth aspect of the present disclosure, there is further provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, it provides a new solution for reference signal transmission and receiving, in which reference signal resources are divided into at least two reference signal groups and reference signals for different layers or users can be multiplexed in different reference signal groups. Thus, more mu-users with unequal allocated bandwidths can supported with significant channel estimation loss and Peak to Average Power Ratio (PAPR) problems.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein:

FIG. 3 schematically illustrates a mapping of cyclicshift to $n_{DMRS}^{(1)}$ values;

FIG. 4 schematically illustrates a mapping of cyclic shift field in uplink-related DCI format to $n_{DMRS,\lambda}^{(2)} \cdot$ and $[w^\lambda(0)\ w^\lambda(1)]$;

FIG. 9 schematically illustrates an example indication manner for indicating the DMRS group configuration in accordance with one embodiment of the present disclosure;

FIG. 10 schematically illustrates another example indication manner for indicating the DMRS group configuration in accordance with another embodiment of the present disclosure;

FIG. 11 schematically illustrates a further example indication manner for indicating the DMRS group configuration in accordance with another embodiment of the present disclosure;

FIG. 12 schematically illustrates DMRS configurations for four new user equipment in accordance with one embodiment of the present disclosure;

DETAILED DESCRIPTION OF EMBODIMENTS

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

Hereinafter, a DMRS pattern and mappings in the existing communication system will be first described with reference to FIGS. 2 to 4, for a better understanding of the present disclosure.

Figure 1:
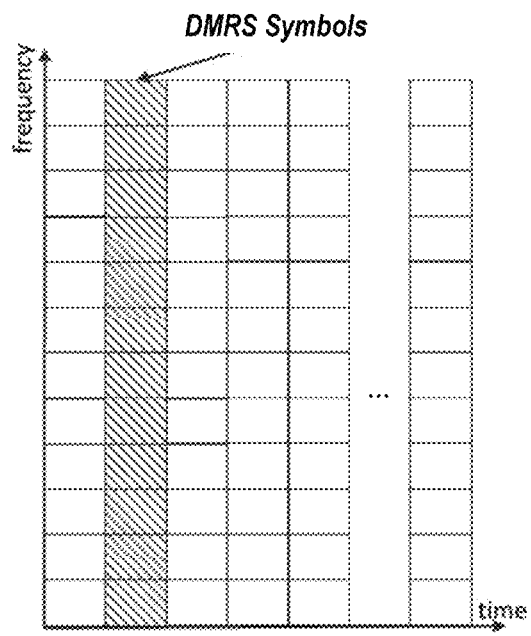
FIG. 1 schematically illustrates one of possible UL symbols in newly proposed subframe structure with reduced UL symbols.
Figure 2:
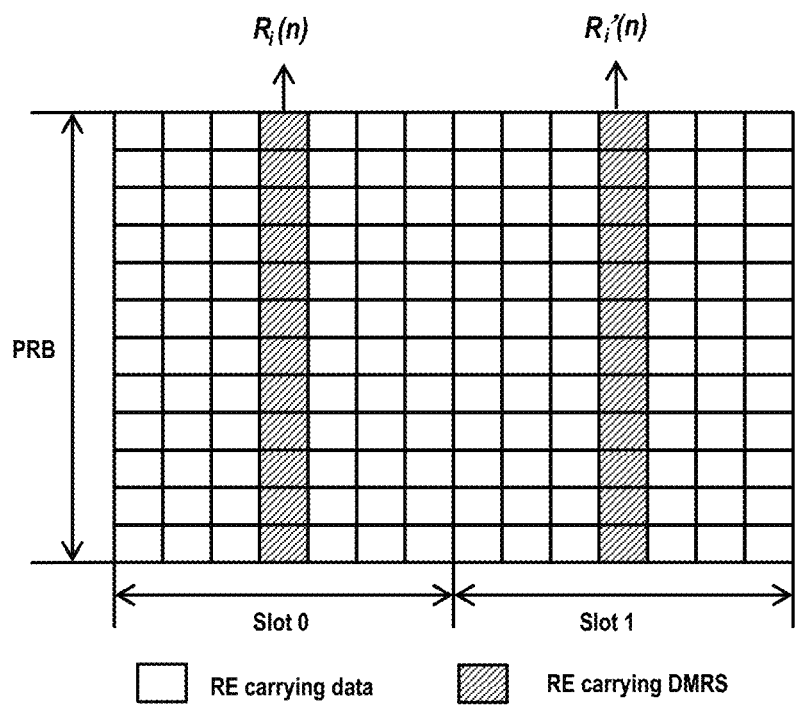
FIG. 2 schematically illustrates a DMRS pattern in the existing communication system.

Reference is first made to FIG. 2, which illustrates a DMRS pattern in the existing communication system in more detail. In the existing communication system, physical uplink sharing channel (PUSCH) is based on Zadoff-Chu sequence. As illustrated in FIG. 2, for UE i, signals $R_i(n)$ and $R'_i(n)$ are DMRS sequence in the first slot and the second slot respectively and they may have different cyclic shifts. Signals $R_i(n)$ and $R'_i(n)$ may have the same root sequence if the sequence group hopping is disabled. In addition, two users transmitting signals in MU-MIMO (referred to as mu-user hereinafter) with unequal bandwidth can use different OCC sequences in the two slots and a plurality of mu-users with equal bandwidth can use different cyclic shift in DMRS.

In the existing communication, the reference signal sequence $r_{u,v}^{(\alpha)}(n)$ is defined by a cyclic shift $\alpha$ of a base sequence $\bar{r}_{u,v}(n)$ according to $$r_{u,v}^{(\alpha)}(n) = e^{j\alpha n}\bar{r}_{u,v}(n), \quad 0 \leq n < M_{sc}^{RS}$$

Where n=0, ..., $M_{sc}^{RS}-1$, $M_{sc}^{RS}=mN_{sc}^{RB}$ is the length of the reference signal sequence and $1 \leq m \leq N_{RB}^{max,UL}$. Multiple reference signal sequences are defined from a single base sequence through different values of $\alpha$. The Base sequences, $\bar{r}_{u,v}(n)$ are divided into groups, where $u \in \{0, 1, \ldots, 29\}$; is the group number, v is the base sequence number within the group, such that each group contains one base sequence (v=0) of each length $M_{sc}^{RS}=mN_{sc}^{RB}$, $1 \leq m \leq 5$ and two base sequences of each length $M_{sc}^{RS}=mN_{sc}^{RB}$, $6 \leq m \leq N_{RB}^{max,UL}$. The sequence group number u and the number v within the group may vary in time and the definition of the base sequence $\bar{r}_{u,v}(0), \ldots, \bar{r}_{u,v}(M_{sc}^{RS}-1)$ depends on the sequence length $M_{sc}^{RS}$.

In addition, the PUSCH demodulation signal sequence $r_{PUSCH}^{(\lambda)}(\cdot)$ associated with layer $\lambda$ is defined by $$r_{PUSCH}^{(\lambda)}(m \cdot M_{sc}^{RS} + n) = w^{(\lambda)}(m)r_{u,v}^{(\alpha_\lambda)}(n)$$

where
m=0, 1
n=0, ..., $M_{sc}^{RS}-1$
and $$M_{sc}^{RS} = M_{sc}^{PUSCH}$$

The sequence $r_{u,v}^{(\alpha_\lambda)}(0), \ldots, r_{u,v}^{(\alpha_\lambda)}(M_{sc}^{RS}-1)$ is $r_{u,v}(0), \ldots, \bar{r}_{u,v}(M_{sc}^{RS}-1)$ as described hereinbefore, and for DCI format 0, the orthogonal sequence $w^{(\lambda)}(m)$ is given by $$[w^\lambda(0) w^\lambda(1)] = [1\ 1].$$

The cyclic shift $\alpha_\lambda$ in slot $n_s$ is given as $\alpha_\lambda = 2\pi n_{cs,\lambda}/12$ with $$n_{cs,\lambda} = (n_{DMRS}^{(1)} + n_{DMRS,\lambda}^{(2)} + n_{PN}(n_k)) \bmod 12$$

where the values of $n_{DMRS}^{(1)}$ is given by Table 5.5.2.2.2-2 of 3GPP TS 36.212, which is illustrated in FIG. 3, according to the parameter cyclicshift provided by higher layers. $n_{DMRS,\lambda}^{(2)}$ is given by the cyclic shift for DMRS filed in most recent uplink-related DCI in 3GPP TS 36.212 for the transport block associated with the corresponding PUSCH transmission. Particularly, the value of $n_{DMRS,\lambda}^{(2)} \cdot$ is given in Table 5.5.2.1.1-1 3GPP TS 36.212, which is illustrated in FIG. 4. The quantity $n_{PN}(n_s)$ is related to the slot and is given by $$n_{PN}(n_s) = \sum_{i=0}^{7} c(8N_{symb}^{UL} \cdot n_s + i) \cdot 2^i$$

where the pseudo-random sequence c(i) is defined by clause 7.2 in 3GPP TS 36.212 and the application of c(i) is cell-specific.

Hereinbefore, the DMRS pattern and mappings used in the existing communication system are described and for more details, one can refer the related content for example in 3GPP TS 36.211

In addition, as mentioned hereinbefore, in a case that only one or few symbols of DMRS is used for both UL and downlink (DL), in order to support higher order multi-user MIMO(MU-MIMO), it shall consider using more orthogonal ports for partially overlapping BWs. However, in exiting communication system, it only supports two multi-users with unequal allocated bandwidths, or it requires much standard effort and too much restriction on length of ZC sequences and cause Peak to Average Power Ratio (PAPR) issues. Thus, a new RS pattern and new RS transmission and receiving solutions are provided in the present disclosure, which will be described in detail with reference to FIGS. 5 to 23.

Figure 5:
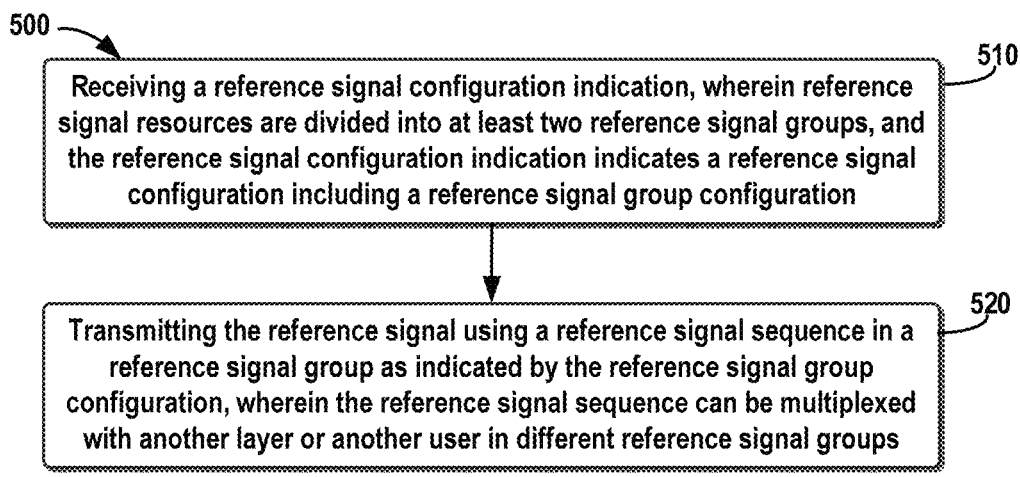
FIG. 5 schematically illustrates a flow chart of a method of transmitting a reference signal in accordance with one embodiment of the present disclosure.

FIG. 5 schematically illustrates a flow chart of a method of transmitting reference signal in accordance with one embodiment of the present disclosure. As illustrated in FIG. 5, first at step 510, a reference signal configuration indication is received, wherein reference signal resources are divided into at least two reference signal groups, and the reference signal configuration indication indicates a reference signal configuration including a reference signal group configuration.

In embodiments of the present disclosure, RS resources, i.e., basic sequence for RS, can be divided into M different groups and the M different groups can be used either in frequency division mode or in time division mode to support more users or more layers. Next, examples will be given to explain it in more details and in those examples, DMRS resources are dived into two groups, i.e., M is equal to 2, for easy understanding; however, the skilled in the art can readily know that the number of M is not limited to 2 and can be any suitable number.

Figure 6A:
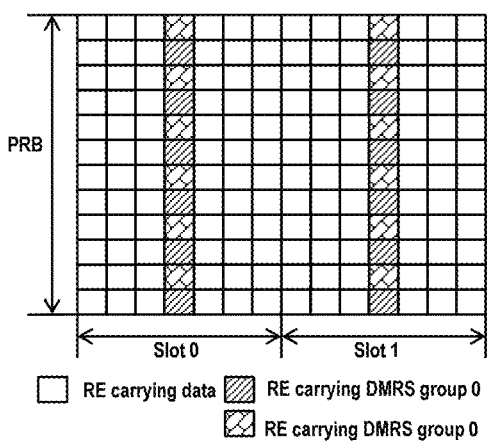
FIGS. 6A and 6B schematically illustrate example DMRS patterns in a frequency division multiplexing (FDM) mode based on DMRS grouping in accordance with one embodiment of the present disclosure.

In FIG. 6A, DMRS resources are dived into two groups, DMRS group 0 and DMRS group 1, resource elements (REs) for carrying DMRS group 0 and REs for carding DMRS group 1 are staggered in the frequency domain. Thus, for one DMRS port/layer, the length of DMRS sequence is half of the length of PUSCH or the legacy DMRS sequence which is not transmitted with the DMRS grouping as proposed herein. Thus, the number of resource blocks (RB) allocated to new UE using the DMRS grouping shall be multiple of M (i.e., 2). For example, in a case of M=2, the numbers of the RB shall be 2, 4, 6, etc. Alternatively, this condition may only need to be satisfied when the number of RBs is less than 6.

Figure 6B:
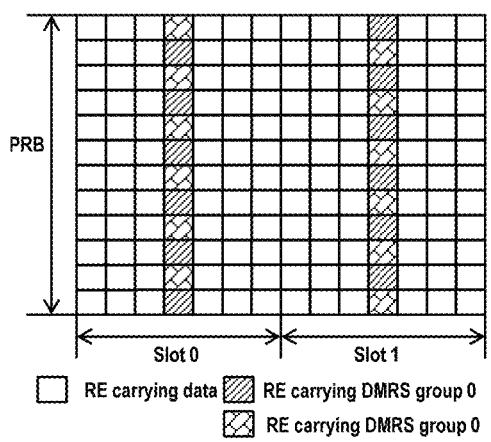

FIG. 6B illustrates an example DMRS pattern in the frequency division multiplexing mode based on DMRS grouping in accordance with one embodiment of the present disclosure. The difference between the DMRS pattern as illustrated in FIG. 6A and that as illustrated in FIG. 6B lies in that reference signal groups are hopped in different symbols. In other words, in the DMRS symbol in slot 0 and in the DMRS symbol in slot 1, REs for carrying DMRS group 0 and REs for carrying DMRS group 1 are staggered in the frequency domain in different ways. In the DMRS symbol in slot 0, REs for carrying DMRS group 0 and REs for carrying DMRS group 1 are staggered in an order of DMRS group 0, DMRS group 1, DMRS group 0, DMRS group 1 . . . , while in the DMRS symbol in slot 1, REs for carrying DMRS group 0 and REs for carrying DMRS group 1 are staggered in an order of DMRS group 1, DMRS group 0, DMRS group 1, DMRS group 0 . . . .

Figure 7:
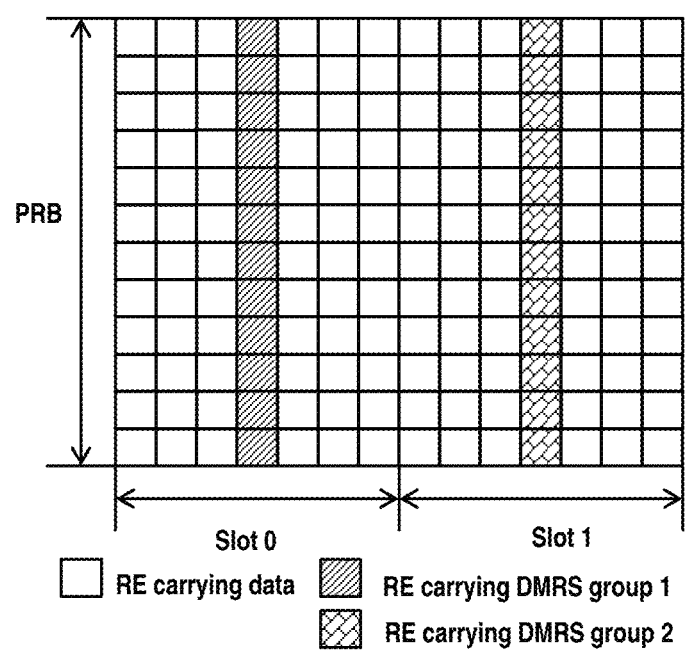
FIG. 7 schematically illustrates an example DMRS pattern in a time division multiplexing mode (TDM) based on DMRS grouping in accordance with one embodiment of the present disclosure.
Figures 8A, 8B, 8C, 8D, 8E, 8F:
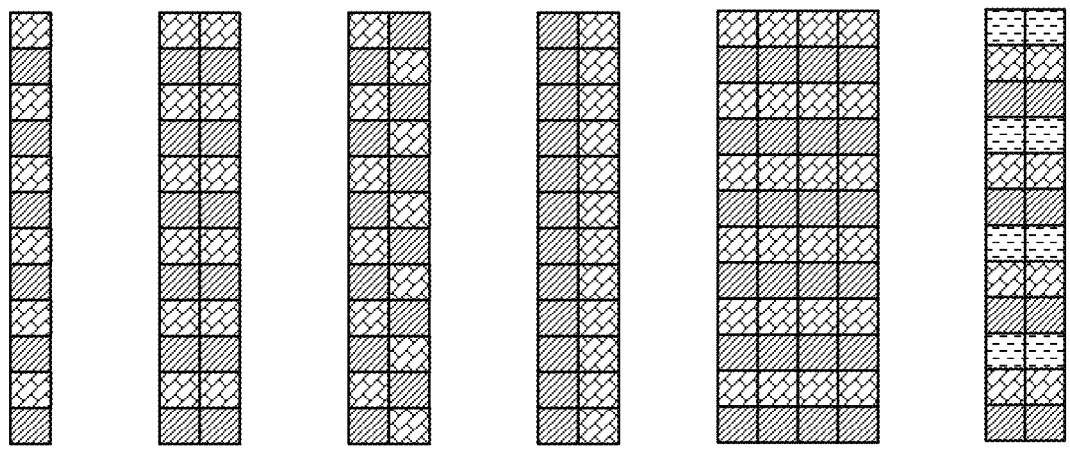
FIGS. 8A to 8F schematically illustrate example possible DMRS patterns based on DMRS grouping in further 5G communication system in accordance with one embodiment of the present disclosure.

FIG. 7 illustrates a further example DMRS pattern based on DMRS grouping in further 5G communication system in accordance with one embodiment of the present disclosure. As illustrated in FIG. 7, the New DMRS patter is achieved based on DMRS grouping but in time division multiplexing mode. That is to say, in the DMRS symbol in the slot 0, all REs are carrying DMRS group 0, while in the DMRS symbol in slot 1, all REs are carrying DMRS group 1.

As a matter of the fact, in the future 5G communication system, the frame structure may also have another form. It can be seen that in the future 5G communication system, the TTI length may be very short, and thus it may include for example two, or four consecutive DMRS symbols in a slot as illustrated FIG. 8A to FIG. 8E. In addition, the M is not limited to 2, it can also be 3 or higher, as illustrated in 8F in FIG. 8.

Regarding whether the legacy DMRS pattern or new DMRS pattern is used, or in other word, whether the DMRS group configuration is enabled, it can be informed by a bit in DRMS configuration Indication (DCI) format information or radio resource control (RRC) signaling. The DMRS group configuration for different UE or different layers of the UE can be indicated by a RS signal indication, which might be a RRC signaling or DCI format information explicitly or implicitly. That is to say, the DMRS group configuration can be indicated by a new RRC signaling, or be indicated by the DCI format which also indicates a cyclic shift configuration and an orthogonal cover code configuration. As an example, the reference signal group configuration can be implicitly indicated by the cyclic shift configuration. As another example, the reference signal group configuration can be explicitly indicated by a bit in the reference signal configuration indication.

In addition, the RRC signaling for the DMRS group configuration can be a separate signaling from the RRC signaling for indicating whether the new DRMS pattern is enabled, or alternatively, whether the new DRMS pattern is enabled and the DMRS group configuration can be indicated in the same RRC signaling. Moreover, the same or different bit in DCI format information can also be used to provide the DMRS group indication and an indication about whether the new DRMS is enabled.

Figures 9, 10:
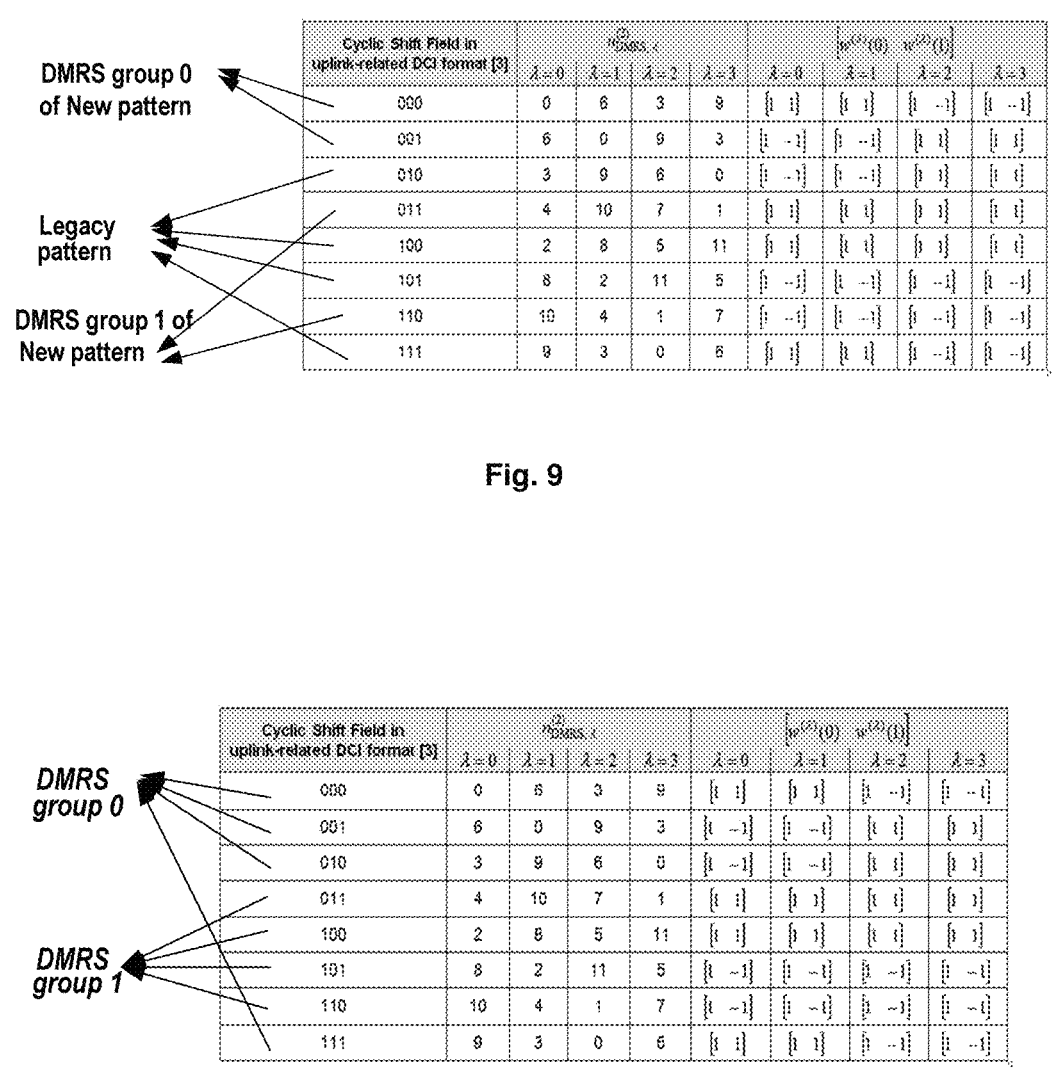

In one embodiment of the present disclosure, only one reference group can be used by one UE. In such a case, the DMRS group configuration can be indicated implicitly by the cyclic shift configuration, i.e., the cyclic shift field in DCI format. For example in FIG. 9, a part of indices in CS field of DCI format are for the new DMRS pattern, and the remaining part of indices in CS field of DCI format are for the legacy DMRS pattern. In other word, in the table for CS field in DCI for the New UEs, all indices are divided into two part, a first part is to indicate to UE that it should use the legacy DMRS pattern, the second part is to indicate to UE that it should use the new DMRS pattern. In the second part, the indices are further divided into two portions, one is for DMRS group 0 and the other is for DMRS group 1 (if M=2). For example, as illustrated in FIG. 9, if the index in DCI format is 000, the UE should use new DMRS group 0 of new DMRS pattern to transmit DMRS; on the other hand, if the index in DCI format is 010, the UE should use the legacy DMRS pattern. In such case, it does not need any RRC signaling or any bit DCI information to indicate the new UE whether the legacy pattern or the new pattern is used.

FIG. 10 schematically illustrates another example indication manner for indicating the DMRS group configuration in accordance with another embodiment of the present disclosure, wherein indices in CS field of DCI format are divided into M parts (M=2). As illustrated in FIG. 10, indices in CS field of DCI format are divided into two parts, one part is for DMRS group 0, and the other part is for DMRS group 1. For example, indices 000,001,010,111 are included the first group, i.e., DMRS group 0, and indices 011,100,101,110 are included in the second group, i.e., DMRS group 1. Alternatively, it is also possible to divide cyclicshift (i.e., $n_{DMRS}^{(1)}$ values as shown in FIG. 4) into M groups based on RRC signaling. As an example, indices 0, 1, 2, 3 correspond to DMRS group 0, and the remaining indices correspond to DMRS group 1. In such case, it may use one-bit RRC signaling or one bit DCI information to indicate whether the legacy pattern or the new pattern is used.

In another embodiment of the present disclosure, more than one reference signal group is allowed to be used by one user equipment. In this case, DMRS sequences for different layers of one UE can be multiplexed in different DMRS groups and it is possible to use new mapping table, which may be informed by an RRC signaling or one bit in DCI format. The example new table is illustrated in FIG. 11, wherein $\Delta_{TC}$ indicate the DMRS group configuration, the value of 0 indicates DMRS group 0; the value of 1 indicates DMRS group 1. From FIG. 11, it is clear that the DMRS group configuration is bound with the CS index and the layer. In such a case, 4 UEs each with 2-layer can be scheduled in the following way, fields 000+001+010+011 are used, the multiplexing is implemented by means of intra UE CS, inter UE OCC and FDM.

In a case that different layers in one UE can be multiplexed by different DMRS groups, two layers can be supported with OCC or FDM, for example, field 100 or 101 with FDM, or field 110 or 111 with OCC. At the same time, in single user (SU) mode, it may support up to 8 layers. In this case, since UE needs to be configured with the layer number, the UE can be implicitly informed of the DMRS, OCC and, FDM. As an example, if UE is configured with 8-layer, and field 000 UE can assume the pre-defined mapping to be: for layer 0-3, CS and OCC, $\Delta_{TC}$ are shown in table; for layer 4-7, CS and OCC is same with layer 0-3 but with $(1-\Delta_{TC})$ for FDM configuration.

In a further embodiment, for SU-MIMO with 4 or more layers, CS, OCC and DMRS group configurations can be implicitly informed to the UE. In such a case, it is possible to use an aggregated reference signal configuration to support more layers in transmitting DMRS. The aggregated reference signal configuration indicates a reference signal configuration aggregated from more than one configuration. For example, the aggregated reference configuration may be formed by aggregating the reference signal configuration indicated by the reference signal configuration indication and another reference signal configuration predetermined to be used therewith. The another reference signal configuration may be a configuration which is obtained from the reference signal configuration indicated by the reference signal configuration indication but with a different reference signal group configuration. Or alternatively, it may be a reference signal configuration in a cyclic field mapping table, which is different from the reference signal configuration indicated by the reference signal configuration indication and is pre-predetermined to be used with the reference signal configuration indicated by reference signal configuration indication. For example, for a layer number v, it may use the same CS/OCC for the first v/2 layers and the second v/2 layers but with different DMRS group configuration therefor. Thus, in this embodiment, even if the reference signal configuration indication only indicates one reference signal configuration, it will aggregate two or more CS/OCC/DMRS group configurations to support more layers (up to 8 layers if a case M=2).

As an example, in the legacy table as illustrated in FIG. 3, two indices (i.e., two configurations) of the CS field are configured to one UE to indicate CS and OCC configurations for 8 layers. The relation between the two indices can be fixed or predetermined, which can be informed to the UE by using the legacy CS field in DCI format. For example, for 8 layers, index 000 actually represents indices 000 and 001 which indicates CS/OCC for the first 4 layers and the second 4 layers respectively, wherein the layer 0, 1, 2 and 3 use CS 0, 6, 3, 9 and OCC [1 1] [1 1] [1 −1] [1 −1], and the layer 4, 5, 6, 7 use CS 6 0 9 3 and OCC [1 −1] [1 −1] [1 1] [1 1]. Or alternatively, the index 000 can be used to indicate CS/OCC for the even layers, e.g. 0, 2, 4, 6, and the index 001 can be used to indicate CS/OCC for odd layers, e.g. 1, 3, 5, 7.

Next, reference is made back to FIG. 5 and as is seen, at step 520, the reference signal is transmitted using a reference signal sequence in a reference signal group as indicated in the reference signal group configuration, wherein the reference signal sequence can be multiplexed with another layer or another user in different reference signal groups.

After receiving the reference signal configuration information, the UE can transmit the DMRS sequence according to the configurations as indicated in the reference signal configuration information.

Taking 4 one-layer UE as an example, UE0, UE1, UE2, UE3 are configured with indices 000, 001, 100 and 101 respectively in DCI format. FIG. 12 illustrates the CS configurations, the OCC configurations and DMRS signals transmitted in slot 0 or slot 1 when four new UE are paired. In the current standard, if the sequence group hopping is disabled, the cyclic shift offset between R'i and Ri should be identical for all these UE in order to support MU-MIMO, i.e. $R'i(n)=e^{j\alpha n} R_i(n)$. In other word, cyclic shift index offset (or after mode 12) between two slots is same for all mu-users. For example, for UE0, cyclic shift indices in slot 0 and 1 are 0 and 6 respectively, the index offset value is 6; for UE3, the index in two slots is 8 and 2 respectively and the offset after mod 12 is also 6.

Figures 13, 14:
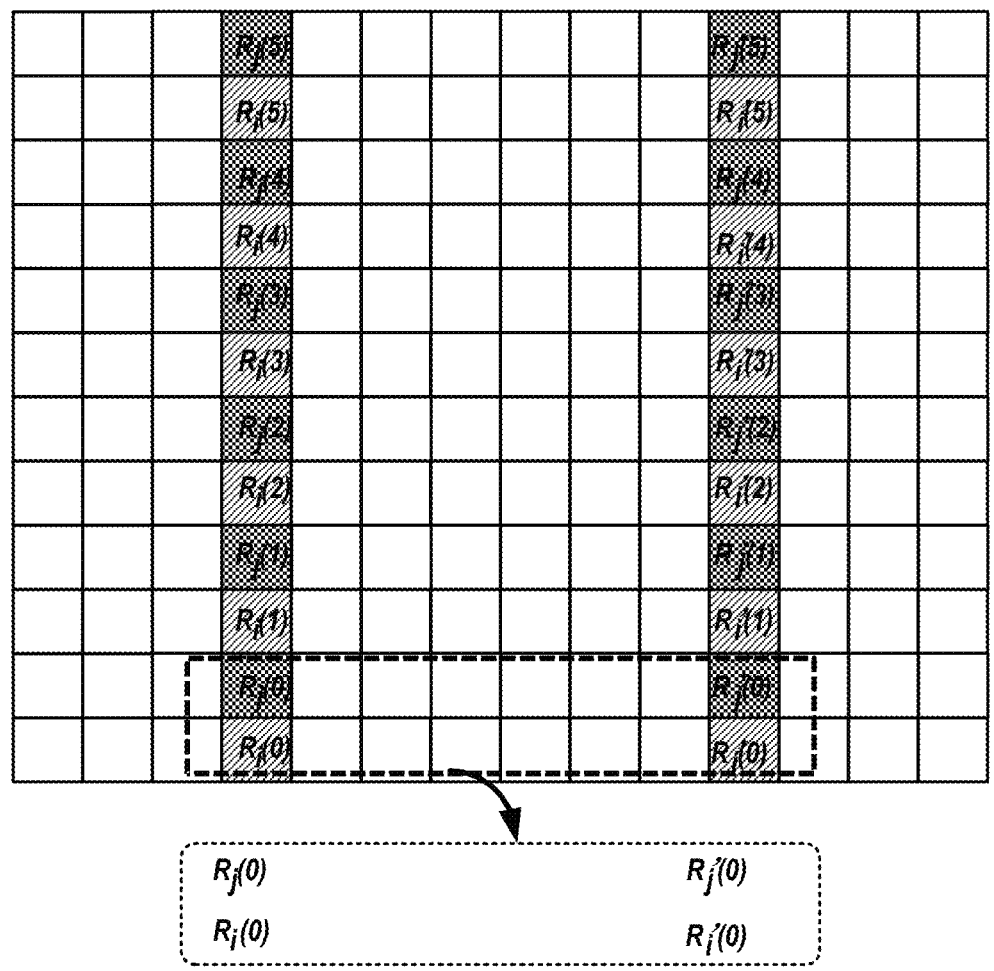
FIG. 13 schematically illustrates DMRS signals transmitted in REs for UEi and UEj in accordance with one embodiment of the present disclosure.
FIG. 14 schematically illustrates DMRS configurations for legacy user equipment and two new user equipment in accordance with one embodiment of the present disclosure.

FIG. 13 illustrates reference signals transmitted by two UE using new DMRS format in two slots wherein the closest four REs, i.e., the first two reference signals in slot 0 and slot 1 are further illustrated at bottom for a purpose of clarification. The symbols in the closest four REs can be given by the following expression:

$$\begin{bmatrix} R_0(n) & e^{j\alpha n}R_0(n) & 0 & 0 \\ R_1(n) & -e^{j\alpha n}R_1(n) & 0 & 0 \\ 0 & 0 & R_2(n) & e^{j\alpha n}R_2(n) \\ 0 & 0 & R_3(n) & -e^{j\alpha n}R_3(n) \end{bmatrix}$$

Form the above expression, it can be seen that for two new UE, the orthogonality can be achieved between these four UE even they have unequal bandwidth.

However, when legacy UE is paired with new UE, it cannot achieve the orthogonality since they use different DMRS pattern and the legacy UE is not multiplexed in different DMRS groups. In other words, for the same frequency resources, the length of legacy DMRS sequence is 2 times of that of new DMRS sequence. Therefore, basically, the resource index of legacy DMRS sequence is 2 times of the new DMRS sequence if the start frequency positions of legacy UE and new UE are same. FIG. 14 illustrates an example of the CS configurations, the OCC configurations and DMRS signals transmitted in slot 0 or slot 1 when the legacy UE is paired with new UEs. The symbols in the closest four REs can be given by the following expression:

$$\begin{bmatrix} R_0(2n) & e^{j\alpha n}R_0(2n) & R_0(2n+1) & e^{j\alpha(2n+1)}R_0(2n+1) \\ R_1(n) & -e^{j\alpha n}R_1(n) & 0 & 0 \\ 0 & 0 & R_2(n) & -e^{j\alpha n}R_2(n) \end{bmatrix}$$

From the expression, it is clear that the orthogonality cannot be achieved. In fact, in order to achieve the orthogonality, the cyclic shift offset between two slots for New UE should be 2 times of legacy ones. In other words, excluding the OCC sequence, the phase shift between two slots should be kept as legacy ones, i.e. $R'_1/R_1=R'_0/R_0$ in the same frequency resource n. Thus, in such a case, it is required to increase a cyclic shift offset between slots for new user equipment transmitting the reference signal, to improve orthogonality between the new user equipment and legacy user equipment.

In one embodiment of the present disclosure, the cyclic shift is magnified by M when the DMRS sequence is generated. For example, for DMRS group 0, reference signal sequence can be changed as:

$$r_{u,v}^{(\alpha)}(n)=e^{j\alpha 2n}\bar{r}_{u,v}(n), 0 \le n < M_{sc}^{RS},$$

For DMRS group 1, reference signal sequence can be changed into:

$$r_{u,v}^{(\alpha)}(n)=e^{j\alpha(2n+1)}\bar{r}_{u,v}(n),\ 0\leq n<M_{sc}^{RS}$$

wherein $MR_{sc}^{RS}$ is the DMRS sequence length. Therefore, if the same frequency resources are allocated to legacy $UE_0$ and the new UE1, the DMRS sequence length of $UE_1$ is half of that of $UE_0$.

After changing the DMRS sequence as proposed, the new symbols in the closest four REs can be given by the following expression:

$$\begin{bmatrix} R_0(2n) & e^{j\alpha 2n}R_0(2n) & R_0(2n+1) & e^{j\alpha(2n+1)}R0(2n+1) \\ R_1(n) & -e^{j\alpha 2n}R_1(n) & 0 & 0 \\ 0 & 0 & R_2(n) & -e^{j\alpha(2n+1)}R_2(n) \end{bmatrix}$$

From the above expression, it can be seen that the orthogonality can be got between the legacy UE and the new UE.

However, in the new DMRS sequence, it can also be seen that the orthogonality between difference CSs is broken. For example, orthogonality between CS0 and CS 6 has broken. In the existing DMRS configuration, the cyclic shift offset is 6, and two closest REs in frequency domain can be one orthogonal group in the legacy patterns. That is to say in the frequency domain, this can be translated into an orthogonal frequency-code spanning blocks of 2 consecutive sub-carriers. Consequently, the granularity of channel estimates is (approximately) one per 2 sub-carriers. After increasing cyclic shift offset when the DMRS sequence is generated, this cannot be guaranteed.

In the embodiment wherein the cyclic shift offset is increased, the orthogonality of CS offset 3 leads to orthogonal frequency-code spanning blocks of 2 consecutive DMRS sub-carriers. In addition, two CSs which have 6 offsets will lead to same DMRS sequence.

$$r_{u,v}^{(\alpha)}(n)=e^{j\alpha 2n}\bar{r}_{u,v}(n),\quad 0\leq n<M_{sc}^{RS}=>r_{u,v}^{(\alpha)}(n)=r_{u,v}^{(\alpha+6)}(n)$$

Therefore, in the new DMRS pattern, CS offset 3 should be used instead of 6. In such a case, the cyclic shift for the new user equipment can be decreased to keep the orthogonality between different cyclic shifts. In such a case, it may consider to shrink $n_{DRMS}^{(1)}$ and/or $n_{DRMS,\lambda}^{(2)}$. That is to say, the equation of $n_{cs,\lambda}$ can be changed as $$n_{cs,\lambda}=((n_{DMRS}^{(1)}+n_{DMRS,\lambda}^{(2)})/2+n_{PN}(n_s))\bmod 12$$

or $$n_{cs,\lambda}=(n_{DMRS}^{(1)}+n_{DMRS,\lambda}^{(2)}/2+n_{PN}(n_s))\bmod 12$$

Figures 15, 16:
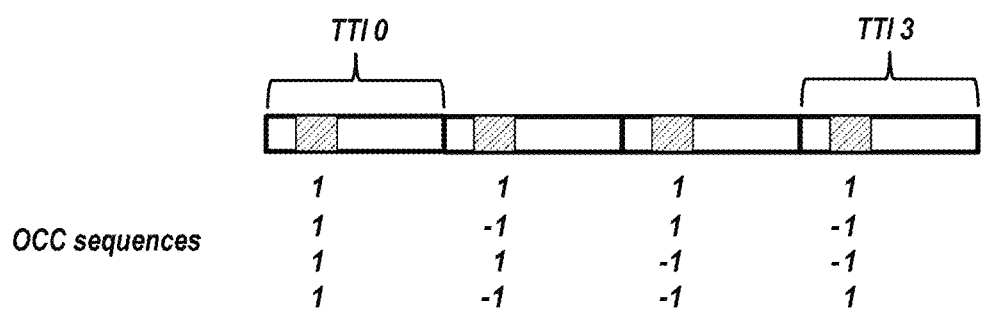
FIG. 15 schematically illustrate an example mapping of cyclic shift field in uplink-related DCI format $n_{DMRS,\lambda}^{(2)} \cdot$ and $[w^\lambda(0)\ w^\lambda(1)]$ in accordance with embodiments of the present disclosure.
FIG. 16 schematically illustrates a diagram of an example multiple transmission time interval (TTI) scheduling in accordance with one embodiment of the present disclosure.

As another option, the new cyclic shift values can be introduced. Especially for up to two layers, the CS offset between the first layer and the second layer should be 3. For example, it is possible to revise the related values 0, 6 to be 0, 3 which corresponds to index 000 in table 5.5.2.1.1.–1 of GPP TS 36.212. FIG. 15 schematically illustrates an example mapping of cyclic shift field in uplink-related DCI format to $n_{DRMS,\lambda}^{(2)}$ and $[w^\lambda(0)\ w^\lambda(1)]$ in accordance with embodiments of the present disclosure. In such a case, it may use the old equation of $n_{cs,\lambda}$ or just using mode 6, as illustrated as below:

$$n_{cs,\lambda}=((n_{DMRS}^{(1)}+n_{DMRS,\lambda}^{(2)})+n_{PN}(n_s))\bmod 6$$

or $$n_{cs,\lambda}=((n_{DMRS}^{(1)}+n_{DMRS,\lambda}^{(2)})+n_{PN}(n_s))\bmod 12$$

As an example, one bit DCI formation or a RRC signal may be used to indicate whether the new DMRS pattern/sequence or legacy DMRS pattern/sequence is to be used. If it is new one, the CS offset between the second layer and the first layer is 3. Since the CS offset is magnified by a factor of M, related DMRS sequences derived from indices 000 and 001 are the same, related DMRS sequences from indices 010 and 111 are the same, related DMRS sequences from indices 011 and 110 are the same, and related DMRS sequences from indices 100 and 101 are also the same. Therefore, the whole CS indices can be divided into 2 groups, one group corresponds to one DMRS group and have different related DMRS sequences. For example, indices 000, 010, 011, 100, 101 can correspond to DMRS group0, the remaining indices may correspond to DMRS group 1. In such a way, when UE receives index 000, it means the UE belongs to DMRS group 0.

In addition, considering backward compatibility, the phase shift between two slots of one subframe for new UEs shall keep same with legacy ones.

For DMRS group 0, reference signal sequence can be kept intact with legacy formula:

$$r_{u,v}^{(\alpha)}(n)=e^{j\alpha n}\bar{r}_{u,v}(n),\ 0\leq n<M_{sc}^{RS}$$

while for DMRS group 1, $$r_{U,V}^{(\alpha)}(n)=e^{j\frac{\alpha}{2}}e^{j\alpha n}\bar{r}_{U,V}(n),\ 0\leq n<M_{sc}^{RS}$$

$$n_{cs,\lambda}=(n_{DMRS}^{(1)}+n_{DMRS,\lambda}^{(2)}+2n_{PN}(n_s))\bmod 12$$

Thus, in this solution, the cyclic shift offset between two slots of one subframe for new UEs also is kept M times of legacy ones.

In addition, it can be seen that in further 5G communication system, the TTI might be very short. In scenarios with a very short TTI length, the DMRS can be removed in some TTIs. In other word, the DMRS is not transmitted in every TTI. In this case, 1 bit or few bits in physical control signaling can used to inform UE how many DMRS symbols are used, or whether there is DMRS symbols in current TTI. If there is no DMRS in a TTI, the UE can use the previous DMRS to demodulate data. In addition, a retransmission without the DMRS can be performed by using the DMRS in previous transmission or initial transmission.

In addition, it may also consider multiple TTI scheduling. In other words, eNB only configures control signaling information in one TTI, and UE can receive or/and transmit data in multiple TTI based on the control signaling information. Thus, in such a case, it is possible that only one or few TTI includes DMRS. As another option, OCC sequences with L length can be used, which is illustrated in FIG. 16 As illustrated, OCC sequences or DFT sequences with a length of L can be applied in the DMRS for these L TTIs. In this case, there is only one DMRS in each of TTIs. Taking. L=4 as an example, four orthogonal OCC sequences can be multiplexed on the DMRS sequence. In this way, maximum 4 layers or 4 mu-users can be multiplexed by OCC sequences.

Figure 17:
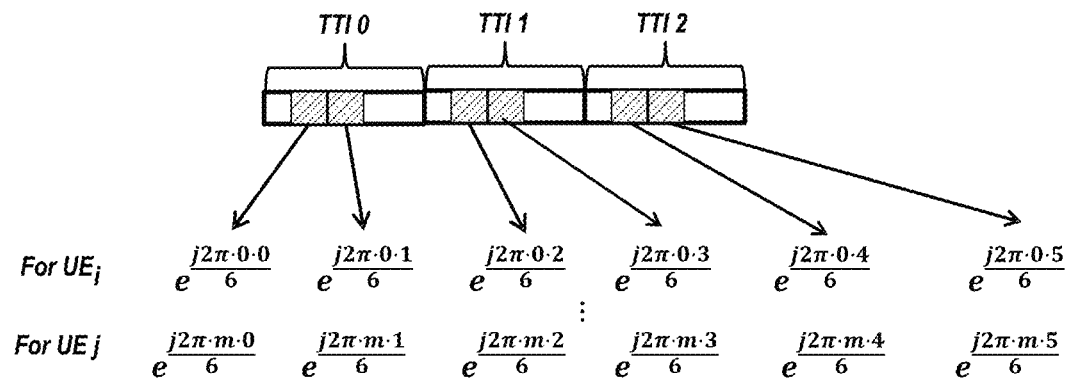
FIG. 17 schematically illustrates a diagram of another example multiple TTI scheduling in accordance in accordance with another embodiment of the present disclosure.

As a further option, it is also possible to use 6 DFT sequences as illustrated in FIG. 17 In such a case, it may transmit two DMRS sequences in each TTI and DFT sequence value can be multiplexed on the DMRS sequence in each TTI. Thus, maximum 6 layers or users can be multiplexed by 6 DFT sequences.

In another different embodiment, each user or layer can be transmitted by using M DMRS group in a staggering pattern. In other word, one UE will transmit multiplex DMRS sequences using M DMRS groups based on the staggering pattern. In this embodiment, UE needs to transmit DMRS sequences in each DMRS group for every layer. In such a case, different UE can be multiplexed by different OCC sequences.

Figure 18:
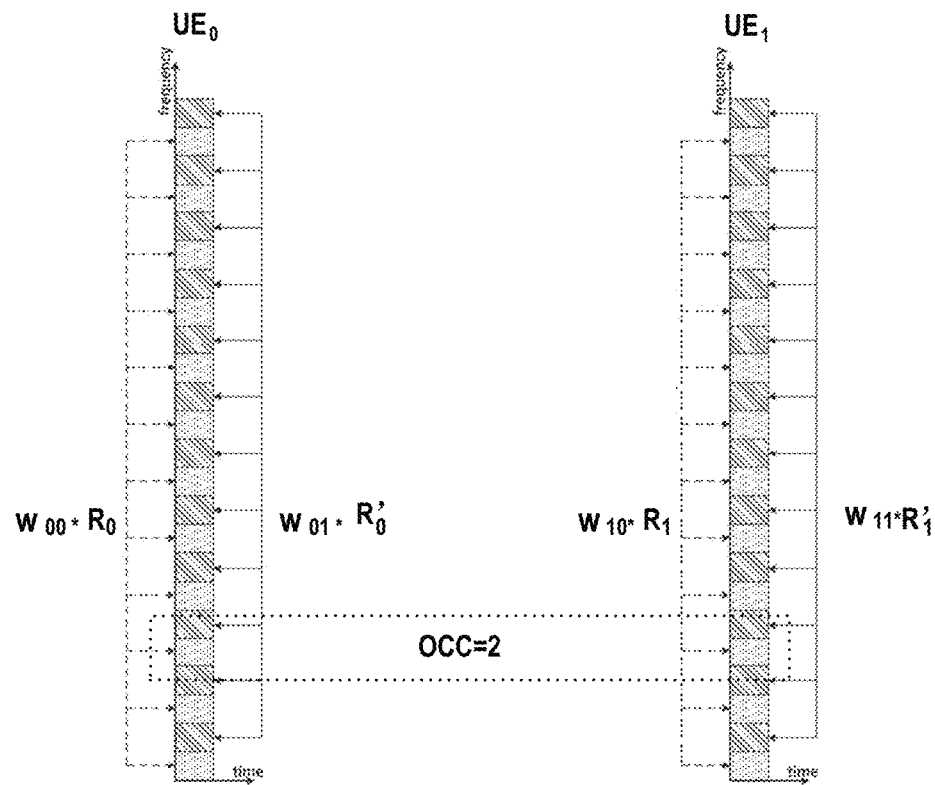
FIG. 18 schematically illustrate an example DMRS transmission based on the staggering pattern in accordance in accordance with one embodiment of the present disclosure.
Figure 19:
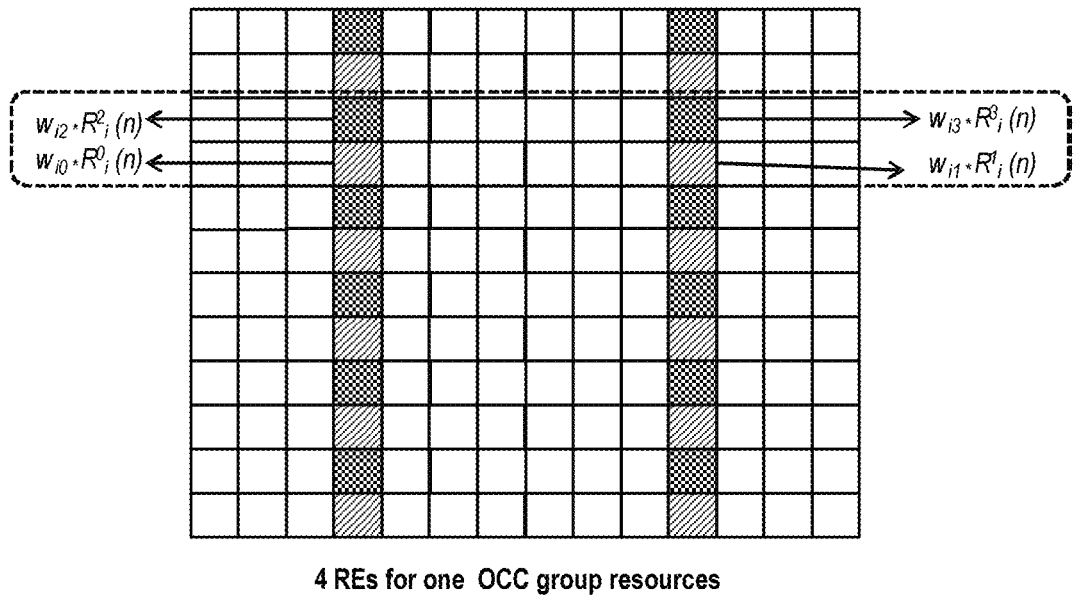
FIG. 19 schematically illustrates DMRS signals transmitted in four resource elements for one OCC group in accordance with another embodiment of the present disclosure.

For example, in a case that only one symbol is used for DMRS transmission as illustrated in FIG. 18 both $UE_0$ and $UE_1$ transmit reference signal sequences using M DMRS groups in the staggering pattern and the two UE transmits the reference signals in MU-MIMO mode with OCC=2 in the same one symbol, wherein $[w_{00}\ w_{01}]32\ [1\ 1]$ and $[w_{10}\ w_{11}]=[1\ -1]$. In such case, $UE_0$ with one layer transmits DMRS sequence $w_{00}*R_0$ in DMRS group 0 and DMRS sequence $w_{01}*R'_0$ in DMRS group1 and meanwhile in the same symbol, $UE_1$ transmits DMRS sequence $w_{10}*R_1$ in DMRS group 0 and DMRS sequence $w_{11}*R'_1$ in DMRS group1. In another case that two symbols are used for DMRS transmission as illustrated in FIG. 19, for example in R10 uplink DMRS pattern, for UE i, four ZC sequences with different CS $R^0i\ R^1i\ R^2i\ R^3i$ can be used and in such a way, it can extend R10 uplink MU-MIMO mechanism with OCC=4 in order to support 4 MU-users, wherein UEs can be scheduled with different bandwidths. In such a case, the OCC may be:

$$[w_{i0}w_{i1}w_{i2}w_{i3}] = [1\ \ 1\ \ 1\ \ 1]; \text{ or}$$

$$[1\ -1\ \ 1\ -1]; \text{ or}$$

$$[1\ \ 1\ -1\ -1]; \text{ or}$$

$$[1\ -1\ -1\ \ 1].$$

In shall be noticed that in the embodiment wherein each user or layer can be transmitted by using M DMRS groups in the staggering pattern, the DMRS sequence can also be changed to have backward compatibility to keep the orthogonally between the new UE and legacy and between different CSs just as described hereinabove. In other word, for all UEs, the cyclic shift offset between the four ZC sequences should be kept same. Particularly, for UE i, the cyclic shift offset between $R^1_i$ and $R^2_i$ can be same as the offset between $R^1_j$ and $R^2_j$ for UEj which are co-scheduled with UEi in one TTI. In the meanwhile, when new UE multiplexing with legacy UE, the cyclic shift offset between the DMRS sequences in two slots should be same as legacy ones as well.

In addition, it is also possible to use further schemes to improve the transmission performance. For example, in a case DMRS groups is enabled, the power in one DMRS RE will be two times than that in PUSCH, if power of DMRS symbols and that of PUSCH symbols are kept same in one TTI. Moreover, the power of DMRS symbols will be half of that in PUSCH symbol if power of one DMRS RE and that of one PUSCH RE is kept same. All these means power imbalance between different symbols. Therefore, it may change the scaling factor to avoid the power imbalance.

Therefore, in the section 5.5.2.1.2 of 3GPP TS 36.213, the amplitude scaling factor can be changed as delta*$\beta_{PUSCH}$, wherein delta can be 1, or sqrt(2) which can be informed to UE as default information. As an example, for UEs with New DMRS pattern, the amplitude scaling factor will be delta*$\beta_{PUSCH}$. Alternatively, cNB can use RRC signaling to inform UE of the delta values, and eNB can choose one value from multiple values for UE. For example, the candidate delta values can be {1, sqrt(2)} or {1, sqrt(2), sqrt(0.5), et.}. In such a way, power imbalance can be alleviated greatly.

Hereinbefore, description is mainly made to the solution of reference signal transmission. In the present disclosure, there is also provided a method of receiving reference signal which will described with reference FIG. 20.

Figure 20:
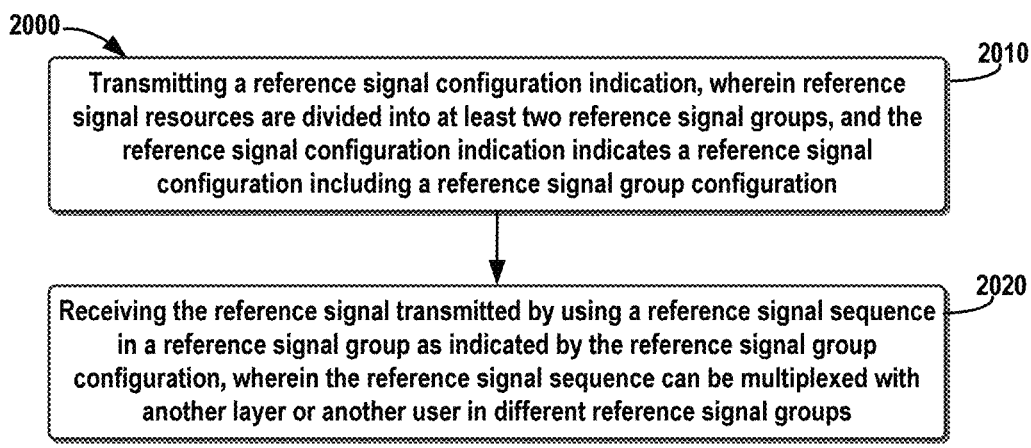
FIG. 20 schematically illustrates a flow chart of a method of receiving a reference signal in accordance with one embodiment of the present disclosure.

As illustrated in FIG. 20, the method 2000 may start from step 2010, in which a reference signal configuration indication is transmitted. Particularly, as described hereinbefore, reference signal resources can divided into at least two reference signal groups, and the reference signal configuration indication can indicate a reference signal configuration including a reference signal group configuration.

In an embodiment of the present disclosure, the reference signal resource can be divided into at least two reference signals and the at least two reference signal groups are multiplexed either in a frequency division multiplexing mode or in a time division multiplexing mode and in such a way, it can support more users or more layers with limited antenna port resources. In addition, in a frequency division multiplexing mode, the at least two reference signal groups can be further hopped in different symbols.

In another embodiment of the present disclosure, reference signal configuration indication may further indicate a cyclic shift configuration and an orthogonal cover code configuration in addition to the reference signal group configuration. This means that the cyclic shift configuration, the orthogonal cover code configuration and the reference signal group configuration can be indicated by the same reference signal indication, i.e., DCI format. For example, the reference signal group configuration may be implicitly indicated by the cyclic shift configuration, or alternatively explicitly indicated by a bit in reference signal configuration indication. In addition, whether the reference signal group configuration is enabled can also be indicated by a bit in reference signal configuration indication or by using a separate RRC signaling.

In some embodiments of the present disclosure, only one reference signal group is allowed to be used by one user equipment. In such a case, a part of indices for the cyclic shift configuration can be reserved for a legacy reference signal pattern, and a remaining part of the indices are divided to at least two groups, each of which is allocated a corresponding one of the at least two reference signal groups. Or alternatively, indices for the cyclic shift configuration can be divided into at least two groups, each of which is allocated a corresponding one of the at least two reference signal groups.

In some embodiments of the present disclosure, more than one reference signal group is allowed to be used by one user equipment. In such a case, the reference signal group indication can be bound with indices for the cyclic shift. In other words, for a specific index for the cyclic shift, the reference signal group indication is predetermined.

Next, as illustrated in step 2020 in FIG. 20, the reference signal is received, which is transmitted by using a reference signal sequence in a reference signal group as indicated by the reference signal group configuration, wherein the reference signal sequence can be multiplexed with another layer or another user in different reference signal groups.

After the reference signal configuration indication is transmitted to the UE, the UE will transmit the reference signal using a reference signal sequence in a reference signal group as indicated by the reference signal group configuration. The eNB may receive the reference signal from the UE wherein the reference signal sequence can be multiplexed with another layer or another user in different reference signal groups.

In addition, it is also possible that the reference signal is transmitted using an aggregated reference signal configuration to support more layers. The aggregated reference configuration may be a reference signal configuration aggregated from more than one configuration, which may be formed by aggregating the reference signal configuration indicated by the reference signal configuration indication and another reference signal configuration predetermined to be used therewith. The another reference signal configuration may be a reference signal configuration, which is obtained from the reference signal configuration indicated by the reference signal configuration indication but with a different reference signal group configuration; or may be a different reference signal configuration in a cyclic field mapping table, which is pre-predetermined to be used with the reference signal configuration indicated by reference signal configuration indication.

The eNB will demodulate the reference signal in accordance with the reference signal configuration that is transmitted to the UE to learn the channel condition.

With embodiments of the present disclosure, it provides a new solution for reference signal transmission and receiving, in which reference signal resources are divided into at least two reference signal groups and reference signals for different layers or users can be multiplexed in different reference signal groups. Thus, more mu-users with unequal allocated bandwidths can be supported without significant channel estimation loss and PAPR loss.

Figure 21:
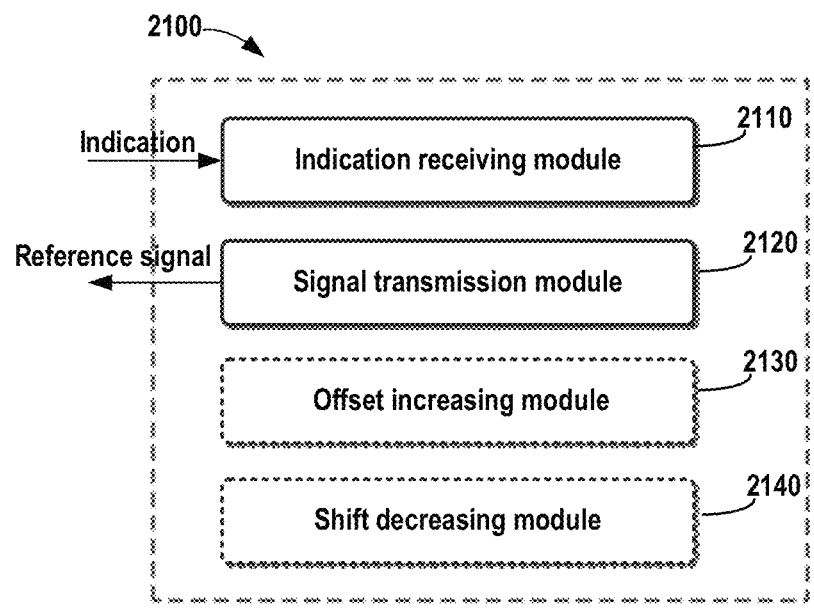
FIG. 21 schematically illustrates a block diagram of an apparatus for transmitting a reference signal in accordance with one embodiment of the present disclosure.

In addition, FIG. 21 further schematically illustrates a block diagram of an apparatus for transmitting a reference signal in accordance with one embodiment of the present disclosure.

As illustrated in FIG. 21, the apparatus 2100 includes an indication receiving module 2110 and a signal transmission module 2120. The indication receiving module 2110 may be configured for receiving a reference signal configuration indication, wherein reference signal resources are divided into at least two reference signal groups, and the reference signal configuration indication indicates a reference signal configuration including a reference signal group configuration. The signal transmission module may be configured for transmitting the reference signal using a reference signal sequence in a reference signal group as indicated by the reference signal group configuration, wherein the reference signal sequence can be multiplexed with another layer or another user in different reference signal groups.

In an embodiment of the present disclosure, the at least two reference signal groups can be multiplexed either in a frequency division multiplexing mode or in a time division multiplexing mode. In the frequency division multiplexing mode, the at least two reference signal groups can be further hopped in different symbols.

In another embodiment of the present disclosure, the reference signal configuration further may indicate a cyclic shift configuration and an orthogonal cover code configuration. In this case, the reference signal group configuration can be implicitly indicated by the cyclic shift configuration or explicitly indicated by a bit in the reference signal configuration indication. In addition, whether the reference signal group configuration is enabled can be indicated by a bit in the reference signal configuration indication although it is also possible to be indicated by a separate RRC signaling.

In a further embodiment of the present disclosure, only one reference signal group can be allowed to be used by a user. In such a case, a part of indices for the cyclic shift configuration can be reserved for a legacy reference signal pattern, a remaining part of the indices can be divided to at least two groups, each of which is allocated a corresponding one of the at least two reference signal groups. Or alternatively, indices for the cyclic shift configuration can be divided into at least two groups, each of which is allocated a corresponding one of the at least two reference signal groups.

In a still further embodiment of the present disclosure, more than one reference signal group can be allowed to be used by a user.

In a yet further embodiment of the present disclosure, the reference signal can be transmitted using an aggregated reference signal configuration to support more layers, and wherein the aggregated reference configuration is formed by aggregating the reference signal configuration indicated by the reference signal configuration indication and another reference signal configuration predetermined to be used therewith. In this case, the another reference signal configuration may be a reference signal configuration which is obtained from the reference signal configuration indicated by the reference signal configuration indication but with a different reference signal group configuration. Or alternatively the another reference signal configuration may be a different reference signal configuration in a cyclic field mapping table, which is pre-predetermined to be used with the reference signal configuration indicated by reference signal configuration indication.

In addition, to improve orthogonality between the new user equipment and legacy user equipment, the apparatus 2100, may further comprise: an offset increasing module 2130, configured for increasing a cyclic shift offset between slots for new user equipment transmitting the reference signal. Additionally, in order to keep the orthogonality between different cyclic shifts, the apparatus 2100 may further comprise a shift decreasing module 2140 configured for decreasing a cyclic shift for the new user equipment to keep the orthogonality between different cyclic shifts.

Figure 22:
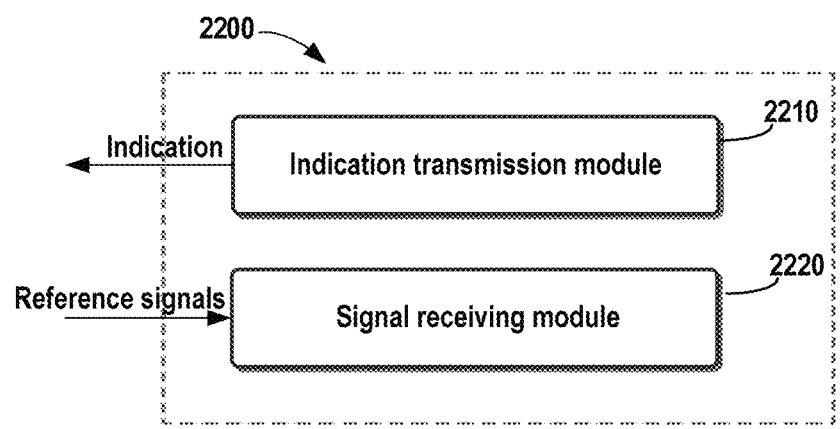
FIG. 22 schematically illustrates a block diagram of an apparatus for receiving a reference signal in accordance with one embodiment of the present disclosure.

FIG. 22 further illustrates an apparatus for receiving a reference signal in accordance with one embodiment of the present disclosure. As illustrated in FIG. 22, the apparatus 2200 may comprise: an indication transmission module 2210 and a signal receiving module 2220. The indication transmission module 2210 may be configured for transmitting a reference signal configuration indication, wherein reference signal resources are divided into at least two reference signal groups, and the reference signal configuration indication indicates a reference signal configuration including a reference signal group configuration. The signal receiving module 2220 may be configured for receiving the reference signal transmitted by using a reference signal sequence in a reference signal group as indicated by the reference signal group configuration, wherein the reference signal sequence can be multiplexed with another layer or another user in different reference signal groups.

In an embodiment of the present disclosure, the at least two reference signal groups are multiplexed either in a frequency division multiplexing mode or in a time division multiplexing mode. In the frequency division multiplexing mode, the at least two reference signal groups can be further hopped in different symbols.

In another embodiment of the present disclosure, the reference signal configuration may further indicate a cyclic shift configuration and an orthogonal cover code configuration. In this case, the reference signal group configuration can be implicitly indicated by the cyclic shift configuration or explicitly indicated by a bit in reference signal configuration indication. In addition, whether the reference signal group configuration is enabled can be indicated by a bit in reference signal configuration indication although it is also possible to be indicated by a separate RRC signaling.

In a further embodiment of the present disclosure, only one reference signal group can be allowed to be used by a user. In such a case, a part of indices for the cyclic shift configuration can be reserved for a legacy reference signal pattern, a remaining part of the indices can be divided into at least two groups, each of which is allocated a corresponding one of the at least two reference signal groups. Or alternatively, indices for the cyclic shift configuration can be divided into at least two groups, each of which is allocated a corresponding one of the at least two reference signal groups.

In a still further embodiment of the present disclosure, more than one reference signal group can be allowed to be used by a user.

In a yet further embodiment of the present disclosure, the reference signal can be transmitted using an aggregated reference signal configuration to support more layers, and wherein the aggregated reference configuration is formed by aggregating the reference signal configuration indicated by the reference signal configuration indication and another reference signal configuration predetermined to be used therewith. In this case, the another reference signal configuration may be a reference signal configuration which is obtained from the reference signal configuration indicated by the reference signal configuration indication but with a different reference signal group configuration. Or alternatively, the another reference signal configuration may be a different reference signal configuration in a cyclic field mapping table, which is pre-predetermined to be used with the reference signal configuration indicated by reference signal configuration indication.

Hereinbefore, the apparatuses 2100 and 2200 are described in brief with reference to FIGS. 21 and 22. It is noted that the apparatuses 2100 and 2200 may be configured to implement functionalities as described with reference to FIGS. 5 to 20. Therefore, for details about the operations of modules in these apparatuses, one may refer to those descriptions made with respect to the respective steps of the methods with reference to FIGS. 5 to 20.

It is further noted that the components of the apparatuses 2100 and 2200 may be embodied in hardware, software, firmware, and/or any combination thereof. For example, the components of apparatuses 2100 and 2200 may be respectively implemented by a circuit, a processor or any other appropriate selection device. Those skilled in the art will appreciate that the aforesaid examples are only for illustration not for limitation. For example, the number M of the DMRS groups is not limited to 2 although it is taken an example to describe the present disclosure. In addition, the reference signal receiving and transmitting solutions are limited only to UL transmission, it is also possible to use for the DL transmission. However, in such a case, unlike the operation as described hereinabove, the eNB will transmit both the reference signal configuration indication and the reference signal instead of transmitting the reference signal configuration indication and receiving the reference signal; while the UE will receive the RS configuration indication and the reference signal and; demodulate the reference signal based on the RS configuration as indicated in the RS configuration indication instead of receiving the RS configuration indication and transmitting reference signal.

Additionally, in some embodiment of the present disclosure, apparatuses 2100 and 2200 may comprise at least one processor. The at least one processor suitable for use with embodiments of the present disclosure may include, by way of example, both general and special purpose processors already known or developed in the future. Apparatuses 2100 and 2200 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 2100 and 2200 to at least perform operations according to the method as discussed with reference to FIGS. 5 to 20 respectively.

Figure 23:
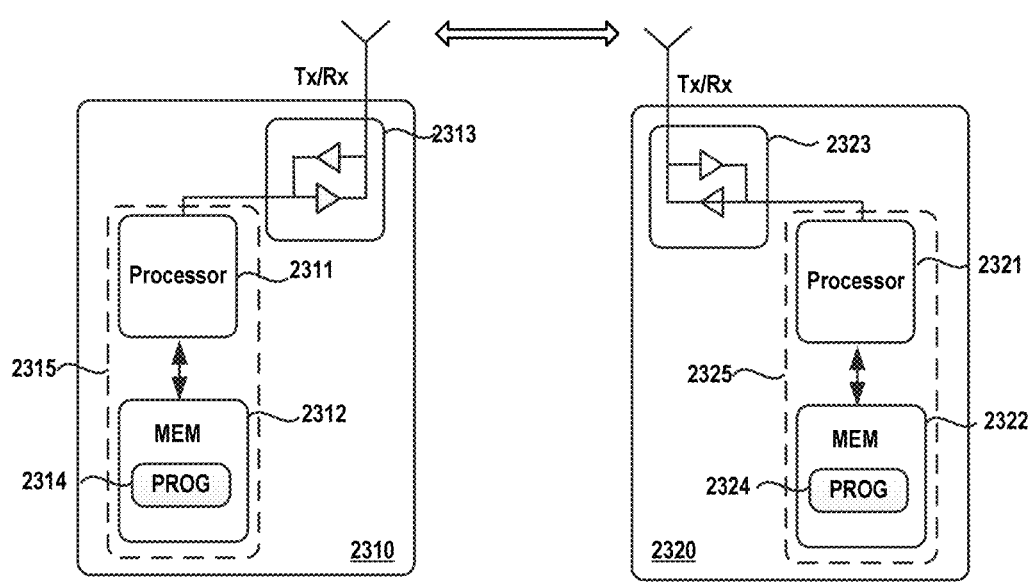
FIG. 23 further illustrates a simplified block diagram of an apparatus 2310 that may be embodied as or comprised in UE and an apparatus 2320 that may be embodied as or comprised in a base station in a wireless network as described herein.

FIG. 23 further illustrates a simplified block diagram of an apparatus 2310 that may be embodied as or comprised in a terminal device such as UE for a wireless network in a wireless network and an apparatus 2320 that may be embodied as or comprised in a base station such as NB or eNB as described herein.

The apparatus 2310 comprises at least one processor 2311, such as a data processor (DP) and at least one memory (MEM) 2312 coupled to the processor 2311. The apparatus 2310 may further comprise a transmitter TX and receiver RX 2313 coupled to the processor 2311, which may be operable to communicatively connect to the apparatus 2320. The MEM 2312 stores a program (PROG) 2314. The PROG 2314 may include instructions that, when executed on the associated processor 2311, enable the apparatus 2310 to operate in accordance with the embodiments of the present disclosure, for example to perform the method 500. A combination of the at least one processor 2311 and the at least one MEM 2312 may form processing means 2315 adapted to implement various embodiments of the present disclosure.

The apparatus 2320 comprises at least one processor 2321, such as a DP, and at least one MEM 2322 coupled to the processor 2321. The apparatus 2320 may further comprise a suitable TX/RX 2323 coupled to the processor 2321, which may be operable for wireless communication with the apparatus 2310. The MEM 2322 stores a PROG 2324. The PROG 2324 may include instructions that, when executed on the associated processor 2321, enable the apparatus 2320 to operate in accordance with the embodiments of the present disclosure, for example to perform the method 2000. A combination of the at least one processor 2321 and the at least one MEM 2322 may form processing means 2325 adapted to implement various embodiments of the present disclosure.

Various embodiments of the present disclosure may be implemented by computer program executable by one or more of the processors 2311, 2321, software, firmware, hardware or in a combination thereof.

The MEMs 2312 and 2322 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 2311 and 3231 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a User Equipment (UE), the method comprising:

receiving an indication from a base station, which indicates whether or not reference signal resources are divided into a first demodulation reference signal group and a second demodulation reference signal group, wherein the first reference signal group corresponds to a first reference signal sequence, and the second reference signal group corresponds to a second reference signal sequence, wherein the first reference signal sequence is defined by a cyclic shift $\alpha$ of a base sequence $\bar{r}_{u,v}(n)$ according to:

$$r_{u,v}^{(\alpha)}(n)=e^{j\alpha n}\bar{r}_{u,v}(n),\ 0 \leq n < M_{sc}^{RS},$$

and the second reference signal sequence is defined by a cyclic shift $\alpha$ of a base sequence $\bar{r}_{u,v}(n)$ according to:

$$r_{u,v}^{(\alpha)}(n) = e^{j\frac{\alpha}{2}}e^{j\alpha n}\bar{r}_{u,v}(n),$$

$0 \leq n < M_{sc}^{RS}$; and generating a reference signal based on the indication.

2. The method of claim 1, further comprising:

transmitting the reference signal to the base station.

3. The method of claim 1, wherein the indication which indicates whether or not the reference signal resources are divided into at least two reference signal groups is transmitted by radio resource control (RRC) signaling.

4. The method of claim 1, wherein the indication to indicate which reference signal group is applied is transmitted by Downlink Control Information (DCI).

5. The method of claim 1, wherein the reference signal resources are divided into two reference signal groups.

6. The method of claim 1, wherein a cyclic shift field corresponding to indices of the second reference signal group is one of: 000, 001, 010, and 111; and a cyclic shift field corresponding to the first reference signal group is one of:

011, 100, 101, and 110.

7. The method of claim 1, wherein one of the first reference signal group and the second reference signal group is mapped to even numbered subcarriers, and the other one of the first reference signal group and the second reference signal group is mapped to odd numbered subcarriers.

8. The method of claim 1, wherein if the reference signal resources are divided into the first reference signal group and the second reference signal group, cyclic shift α for at least one of the first reference signal sequence and the second reference signal sequence associated with layer λ in a slot $n_s$ is given as $\alpha_\lambda = 2\pi n_{cs,\lambda}/12$ $$N_{cs,\lambda} = (n_{DMRS}^{(1)} + n_{DMRS,\lambda}^{(2)} + 2n_{PN}(n_\lambda)) \bmod 12.$$

9. The method of claim 1, wherein length of at least one of the first reference signal sequence and the second reference signal sequence is half of the length of a legacy Demodulation Reference Signal (DMRS) sequence.

10. The method of claim 1, wherein length of each of the first reference signal sequence and the second reference signal sequence is $M^{RS_{sc}} = mN^{RB_{sc}}/2$, wherein $N^{RB_{sc}}$ is a resource block size in frequency domain, expressed as a number of subcarriers, and $1 \leq m \leq N^{max,UL_{RB}}$, $N^{max,UL_{RB}}$ given as a largest uplink bandwidth configuration.

11. The method of claim 1, wherein length of each of at least one of the first reference signal sequence and the second reference signal sequence is $M^{RS_{sc}} = mN^{RB_{sc}}/2$, wherein $N^{RB_{sc}}$ is a resource block size in frequency domain, expressed as a number of subcarriers, and $1 \leq m \leq N^{max,UL_{RB}}$, $N^{max,UL_{RB}}$ given as a largest uplink bandwidth configuration.

12. A method performed by a base station, the method comprising:
  transmitting an indication to a User Equipment (UE), which indicates whether or not reference signal resources are divided into a first demodulation reference signal group and a second demodulation reference signal group,
  wherein the first reference signal group corresponds to a first reference signal sequence, and the second reference signal group corresponds to a second reference signal sequence,
  wherein the first reference signal sequence is defined by a cyclic shift a of a base sequence $\bar{r}_{u,v}(n)$ according to:

$$r_{u,v}^{(\alpha)}(n) = e^{j\alpha n}\bar{r}_{u,v}(n), \quad 0 \leq n < M_{sc}^{RS},$$

and the second reference signal sequence is defined by a cyclic shift α of a base sequence $\bar{r}_{u,v}(n)$ according to:

$$r_{u,v}^{(\alpha)}(n) = e^{j\frac{\alpha}{2}}e^{j\alpha n}\bar{r}_{u,v}(n),$$

$0 \leq n < M_{sc}^{RS}$; and receiving a reference signal based on the indication.

13. The method of claim 12, wherein the indication to indicate which reference signal group is applied is transmitted by Downlink Control Information (DCI).

14. The method of claim 12, wherein the indication which indicates whether or not the reference signal resources are divided into at least two reference signal groups is transmitted by radio resource control (RRC) signaling.

15. The method of claim 12, wherein the reference signal resources are divided into two reference signal groups.

16. The method of claim 12, wherein a cyclic shift field corresponding to indices of the second reference signal group is one of: 000, 001, 010, and 111; and
  a cyclic shift field corresponding to the first reference signal group is one of:
011, 100, 101, and 110.

17. The method of claim 12, wherein one of the first reference signal group and the second reference signal group is mapped to even numbered subcarriers, and the other one of the first reference signal group and the second reference signal group is mapped to odd numbered sub carriers.

18. The method of claim 12, wherein if the reference signal resources are divided into the first reference signal group and the second reference signal group, cyclic shift α for at least one of the first reference signal sequence and the second reference signal sequence associated with layer λ in a slot $n_s$ is given as $\alpha_\lambda = 2\pi n_{cs,\lambda}/12$ with $$N_{cs,\lambda} = (n_{DMRS}^{(1)} + n_{DMRS,\lambda}^{(2)} + 2n_{PN}(n_\lambda)) \bmod 12.$$

19. The method of claim 12, wherein length of at least one of the first reference signal sequence and the second reference signal sequence is half of the length of a legacy Demodulation Reference Signal (DMRS) sequence.

* * * * *